United States Patent
Kahn et al.

(10) Patent No.: US 9,421,956 B2
(45) Date of Patent: Aug. 23, 2016

(54) VEHICLE BRAKING ASSEMBLY

(71) Applicant: Ford Global Technologies, LLC, Dearborn, MI (US)

(72) Inventors: Adil Kahn, Lakeshore (CA); Clement Sagan, Dearborn, MI (US); Dale Scott Crombez, Livonia, MI (US); Daniel A. Gabor, Canton, MI (US); Daniel Anthony Villar, Canton, MI (US); Mark Muddiman, Belleville, MI (US); Prashanth Kaparthi, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 201 days.

(21) Appl. No.: 14/064,444

(22) Filed: Oct. 28, 2013

(65) Prior Publication Data

US 2014/0041470 A1 Feb. 13, 2014

Related U.S. Application Data

(62) Division of application No. 12/629,752, filed on Dec. 2, 2009, now Pat. No. 8,607,660.

(51) Int. Cl.
| | |
|---|---|
| G05G 1/30 | (2008.04) |
| B60T 11/18 | (2006.01) |
| B60T 7/06 | (2006.01) |
| G05G 1/40 | (2008.04) |
| G05G 1/46 | (2008.04) |
| G05G 23/02 | (2006.01) |

(52) U.S. Cl.
CPC . *B60T 11/18* (2013.01); *B60T 7/06* (2013.01); *G05G 1/40* (2013.01); *G05G 1/46* (2013.01); *G05G 23/02* (2013.01); *Y10T 29/49826* (2015.01); *Y10T 74/1896* (2015.01); *Y10T 74/20528* (2015.01)

(58) Field of Classification Search
CPC ............. G50G 1/30; B60T 11/18; B60T 7/06; G05G 23/02; G05G 1/40; G05G 1/46; Y10T 74/20528; Y10T 74/1896; Y10T 29/49826
USPC .......... 74/512–514; 303/113.3; 188/72.7, 210
See application file for complete search history.

(56) References Cited

U.S. PATENT DOCUMENTS

| | | | | |
|---|---|---|---|---|
| 2,834,184 | A * | 5/1958 | Ingres | 60/553 |
| 3,113,489 | A | 12/1963 | Cruse et al. | |
| 3,199,298 | A | 8/1965 | Brown et al. | |
| 3,798,995 | A * | 3/1974 | Schroter | 74/512 |
| 3,838,629 | A | 10/1974 | Meyers | |
| 4,026,164 | A * | 5/1977 | Mozingo | 74/478 |
| 4,283,994 | A | 8/1981 | Belart | |

(Continued)

FOREIGN PATENT DOCUMENTS

| | | |
|---|---|---|
| EP | 0229350 A2 | 7/1987 |
| FR | 2887837 A1 | 1/2007 |

(Continued)

*Primary Examiner* — Adam D Rogers
(74) *Attorney, Agent, or Firm* — Raymond L. Coppiellie; Brooks Kushman P.C.

(57) ABSTRACT

The present disclosure relates to various vehicle braking assemblies. Brake pedal arms include, for example, a cam block that is configured to simplify the engagement between the power booster and pedal arm. Cam block can be movable with respect to the pedal arm to manage the gap between the pedal arm and power booster in by-wire braking assemblies.

6 Claims, 7 Drawing Sheets

(56) References Cited

U.S. PATENT DOCUMENTS

| | | | |
|---|---|---|---|
| 4,508,009 A | 4/1985 | Shimamura et al. | |
| 4,565,067 A | 1/1986 | Tami et al. | |
| 4,599,924 A | 7/1986 | Klostermann et al. | |
| 4,658,660 A | 4/1987 | Parker | |
| 4,672,860 A | 6/1987 | Parker | |
| 4,708,028 A | 11/1987 | Pardy | |
| 6,155,385 A | 12/2000 | Basnett | |
| 6,553,864 B1 | 4/2003 | Ersoy et al. | |
| 7,017,441 B2 * | 3/2006 | Hayashihara et al. | 74/512 |
| 7,111,703 B2 | 9/2006 | Endo et al. | |
| 7,228,758 B2 * | 6/2007 | Fujiwara | 74/512 |
| 7,322,269 B2 | 1/2008 | Faller et al. | |
| 7,409,889 B2 | 8/2008 | Hurwie et al. | |
| 7,584,683 B2 * | 9/2009 | Fujiwara | 74/516 |
| 8,607,660 B2 * | 12/2013 | Khan et al. | 74/512 |
| 8,646,357 B2 * | 2/2014 | Khan et al. | 74/560 |
| 2003/0075005 A1 | 4/2003 | Schiel et al. | |
| 2004/0071817 A1 | 4/2004 | Fischer et al. | |
| 2007/0193394 A1 | 8/2007 | Collins | |
| 2008/0047386 A1 | 2/2008 | Ridgway et al. | |
| 2008/0196983 A1 | 8/2008 | Von Hayn et al. | |
| 2009/0001805 A1 * | 1/2009 | Schick et al. | 303/9.61 |
| 2009/0229402 A1 * | 9/2009 | Khan | B60T 1/10 74/512 |

FOREIGN PATENT DOCUMENTS

| | | | |
|---|---|---|---|
| JP | 05185912 A * | 7/1993 | |
| JP | 2004131065 A | 4/2004 | |

* cited by examiner

VEHICLE BRAKING ASSEMBLY

CROSS-REFERENCE TO RELATED APPLICATION

This application is a division of U.S. application Ser. No. 12/629,752 filed Dec. 2, 2009, now U.S. Pat. No. 8,607,660, the disclosure of which is incorporated in its entirety by reference herein.

TECHNICAL FIELD

The present disclosure relates to vehicle braking assemblies. Various pedal-booster engagements for the braking assemblies are discussed herein.

BACKGROUND

Contemporary vehicles include various braking systems that enable the operator to stop the vehicle by applying pressure to a brake pedal. Vehicle braking assemblies include a pedal with arm connected to the braking system. A power booster can be positioned with respect to the pedal arm; the power booster amplifies the braking force provided by the pedal arm. It is standard to include a clevis pin connected to the pedal arm and a clevis attached to the pedal booster. The clevis assembly guides the pedal arm into alignment and with engagement with the power booster. Conventional hybrid electric vehicles include by-wire braking assemblies having clevis assemblies. Such assemblies, however, can be very complex to install. Moreover, the parts for the clevis assembly can increase the end-item part costs for the vehicle braking assembly.

U.S. Patent Application Publication No. 20070193394—for example—discloses a push rod bracket assembly that includes a booster clevis having a pushrod support wall, with a booster push rod extending outward therefrom into engagement with the booster assembly. Extending away from the pushrod support wall are two legs, a retainer clevis leg and a slotted clevis leg. The retainer clevis leg mounts on a first side of the brake pedal arm and includes a pin hole that aligns with the bracket attachment hole. This assembly still requires the basic components of a clevis assembly which can be costly to produce and install.

Existing attempts to remove the clevis assembly from the braking system require parts that are similarly complicated. For example, U.S. Pat. No. 7,409,889 discloses an arrangement in which an end of a booster control rod has a head and a spherical bearing surface is housed in a complementary boss formed in a wall of the intermediate part of the booster actuating bar. A retaining pin is used to couple the booster rod to the pedal arm. Though this assembly does not require a traditional clevis, the assembly is complicated and adds production and manufacturing costs to the vehicle as well.

Therefore, it is desirable to reduce part complexity for the braking assembly by reducing the number of end-item parts to the plant. It is beneficial to provide a simpler engagement between the power booster rod and brake pedal arm to reduce the production and manufacturing costs of the vehicle.

Other considerations also come into play when designing a by-wire vehicle braking system. In vehicles having regenerative braking systems there can be a gap defined between the brake pedal arm and hydraulic booster interface to allow for at least some of the rotational energy in the wheels to be harvested. This gap can be of larger or smaller sizes to accommodate different vehicle specifications. Where there is a failure in the by-wire braking system, the gap is undesirable and can unnecessarily delay the application of the hydraulic braking system. In by-wire braking systems that decouple the brake pedal from the active booster the gap between the booster and the pedal needs to be overcome if the system is no longer able to operate in by-wire mode. The resulting brake pedal travel is undesirable.

It is also desirable to provide a gap management device for a by-wire braking system. It would be beneficial to have a brake pedal assembly in which the spacing between the pedal arm and power booster can be adjusted for different vehicle conditions. In the case of by-wire system failure, it is desirable to have a braking assembly that closes the spacing between the pedal arm and the hydraulic booster interface.

SUMMARY

The present invention may address one or more of the above-mentioned issues. Other features and/or advantages may become apparent from the description which follows.

Accordingly to one exemplary embodiment of a braking assembly includes: a brake pedal, a pedal arm coupled to the brake pedal; a cam block attached to the pedal arm; and a power booster configured to engage the cam block when the brake pedal is applied a predetermined amount. The booster includes a push rod configured to extend into the cam block. The cam block includes a tapered surface configured to guide a push rod in the cam block.

Another exemplary embodiment relates to a by-wire braking assembly, comprising: a brake pedal; a pedal arm coupled to the brake pedal; a cam surface coupled to the pedal arm; a power booster configured to engage the cam surface when the brake pedal is applied a predetermined amount; and a push rod included in the power booster, configured to linearly move when engaging the cam surface.

According to another exemplary embodiment, a method of manufacturing a vehicle braking assembly is provided. The method includes: providing a pedal; providing a pedal arm configured to pivot with respect to the vehicle; coupling the pedal to the pedal arm; forming a cam block configured to engage a power booster; and coupling the cam block to the pedal arm.

Some of the advantages of the present invention(s) are that they eliminate the need for an assembly operator to insert a clevis/booster/pedal pin. Packaging constraints are less limiting. The present invention also presents significant cost and possible weight reduction.

The present invention(s) reduce part complexity for the braking assembly by reducing the number of end-item parts to the plant. The present teachings also provide a simpler engagement between the power booster rod and brake pedal arm to reduce the production and manufacturing costs of the vehicle.

Another advantage of the present invention(s) is that they provide a gap management device for a by-wire braking system. The gap management device enables the braking assembly to be integrated into multiple vehicle platforms. Moreover, in the case of by-wire system failure, the braking assembly closes the spacing between the pedal arm and the hydraulic booster interface to reduce the response time of the hydraulic braking system.

When the clevis/pedal pin is not appropriately inserted into the pedal arm the pin can fall out of alignment during vehicle operation. The present invention(s) also eliminate the failure mode of the clevis/pedal pin not being inserted or being incorrectly inserted into the pedal arm.

Other advantages of the present teachings are that the cam surface provides a longer booster/master cylinder stroke for the same pedal travel. The cam surface also provides a variable ratio pedal. In some embodiments, the cam surface includes a tapered inner surface (e.g., a conical or funnel shaped opening). The tapered surface provides easier assembly particularly if the booster is mounted on the vehicle after the brake pedal assembly.

Another advantage of the present invention(s) is that pedal ratio is not significantly affected by changes in the position of the push rod. The position of the push rod can be changed without the changing the cam surface to reduce the articulation of the booster push rod. Therefore, the push rod can still rotate within the same arc of rotation (e.g., +/−3 degrees).

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same references numbers are used in the figures for identical or essentially identical elements. The above features and advantages and other features and advantages of the present invention are readily apparent from the following detailed description of the best modes for carrying out the invention when taken in connection with the accompanying drawings. In the figures:

DETAILED DESCRIPTION

Figure 1:
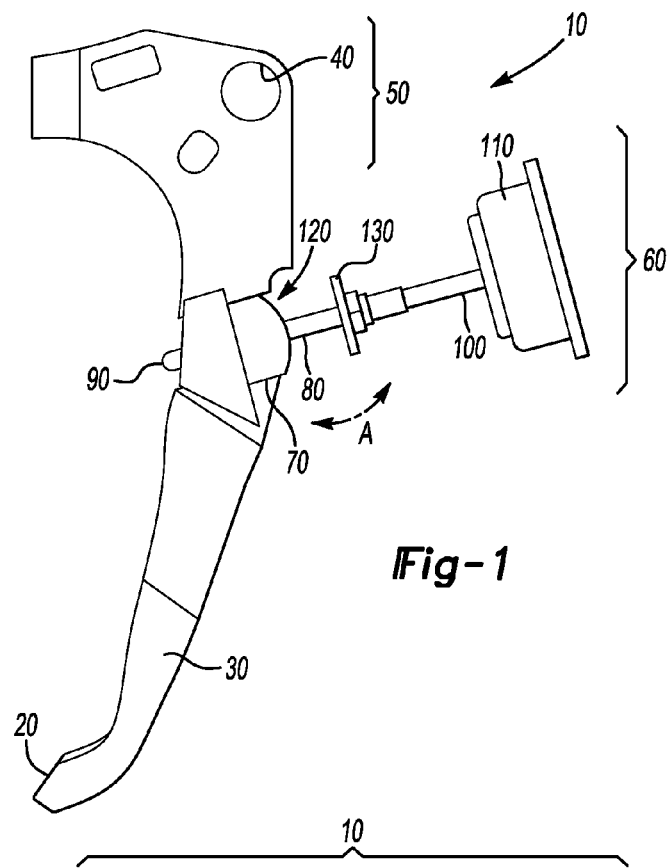
FIG. 1 is a side view of a vehicle braking assembly with power booster according to an exemplary embodiment of the present invention.

Referring to the drawings, FIGS. 1-14, wherein like characters represent the same or corresponding parts throughout the several views there is shown several exemplary vehicle braking assemblies according to the present invention. The provided vehicle braking assemblies eliminate the need for a clevis and clevis pin in the booster-to-pedal-arm engagement. Several exemplary mechanical cam blocks, configured to engage the power booster are illustrated and described herein. The cam blocks discussed provide a simpler, less expensive design and are easier to manufacture and assemble.

Referring now to FIG. 1, there is shown therein a side view of a vehicle braking assembly 10 according to one exemplary embodiment of the present invention. The shown braking assembly 10 is a by-wire system that also incorporates hydraulic braking. The assembly includes a mechanical pedal 20 proximate a vehicle floor (not shown) that is coupled to a pedal arm 30. Pedal arm 30 is attachable to a vehicle structure at 40. The pedal arm is 30 configured to rotate with respect to the vehicle about the upper end 50 of the pedal arm. A vehicle operator can apply pressure to the pedal 20 to initiate braking. The pedal arm 30 includes features that enable the pedal arm to engage with a power booster assembly 60 when the pedal 20 is sufficiently pressed. In the illustrated embodiment of FIG. 1, the pedal arm 30 is shown in an unapplied (or non-pressed) position.

Formed into the pedal arm 30 is a cam block 70, as shown in FIG. 1. Cam block 70 is attached to the pedal arm 30 and coupled thereto. Cam block 70 is configured to engage the power booster 60. In the shown embodiment, the cam block 70 is configured to engage a power booster push rod 80. Rod 80 extends through the cam block 70 when the pedal 20 is not applied (as shown in FIG. 1). The push rod 80 is long enough so that, with the pedal arm 30 in the unapplied position or upmost position and the booster or master cylinder in the maximum full stroke condition, the rod is still at least partially captured in the cam block 70 as shown. In this manner, the push rod 80 and cam block 70 cannot disengage even when in the worst or most distant conditions. A first end of rod 90 is shown on one side of the pedal arm 30 and cam block 70. A second end 100 of the rod is anchored in a valve block (not shown) of the power booster assembly 60. When the push rod 80 is moved farther into the cylinder 110 a higher brake fluid pressure is achieved in the master braking cylinder (not shown). In this embodiment, the push rod 80 is designed to be longer than a maximum booster or master cylinder stroke.

Cam block 70 includes an outer surface 120 that selectively engages the power booster 60 when the pedal arm 30 rotates toward the power booster assembly. Surface 120 is curved and includes an arc or spline (cam) surface; the surface rotates with respect to a flange 130 on the power booster assembly 60. The flange 130 has a flat surface. The curved surface 120 on the side of the cam block 70 at least partially translates the rotational energy of the pedal arm 30 into linear movement of the flange 130 on the power booster assembly 60 when the pedal arm is rotated forward with respect to the vehicle.

Figure 2:
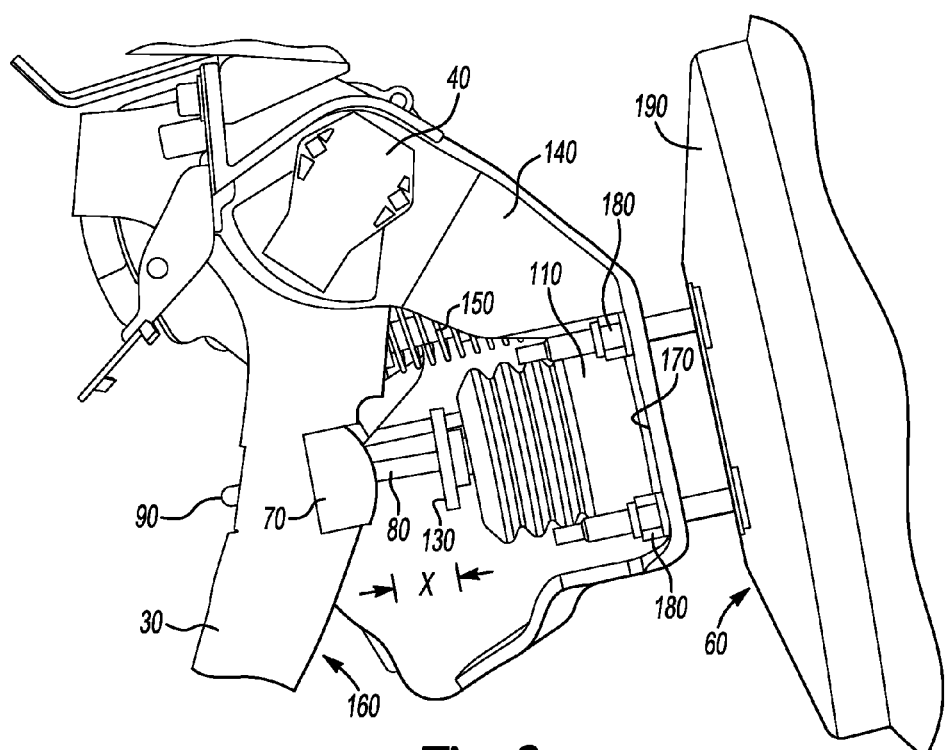
FIG. 2 is a partial cross-sectional view of the vehicle braking assembly of FIG. 1.

FIG. 2 illustrates a partial cross-sectional view of the vehicle braking assembly 10 of FIG. 1, highlighting the power booster 60 and pedal arm 30 engagement. FIG. 2 is a focused side view of the booster-to-pedal-arm engagement for the braking assembly 10. In the shown embodiment, the pedal arm 30 and power booster assembly 60 are commonly coupled to a bracket 140. Bracket 140 is coupled to a vehicle structure. Pedal arm 30 rotates with respect to bracket 140 about point 40. A return spring 150 is included in the braking assembly 10 to apply a restorative force to the pedal arm 30 when moving from an applied position to an unapplied position.

In FIG. 2, the incorporation of cam block 70 in the pedal arm 30 is shown. Cam block 70 is formed to be one singular piece with the pedal arm 30. The curved surface of the cam block 70 extends beyond a forward surface 160 of the pedal arm 30 to engage the flange 130 on the push rod 80. The push rod 80 extends through an orifice 170 in bracket, the cylinder 110 or strut is attached thereto through fasteners 180. A shell 190 of the power booster assembly houses a diaphragm and valve block (not shown) in fluid communication with the master cylinder of the hydraulic braking system.

There is a gap or spacing, "X", between the cam block 70 and the flange 130 as shown in FIG. 2. The pedal arm 30 rotates partially through its arc of rotation without engaging the flange 130. This gap, X, delays the response from the power booster assembly 60—and in some instances the hydraulic braking system—when the pedal 20 (as shown in FIG. 1) is applied. With this gap, X, the push rod 80 does not move linearly but extends further through the pedal arm 30. The gap, X, enables regenerative braking to take effect and the rotational energy of the wheels to be harvested before the friction brakes are applied. The gap distance can change to adjust to vehicle specifications or user demands. The gap can be larger or smaller than the gap illustrated in FIG. 2. An exemplary gap is 9-12 millimeters which can translate to approximately 0.2 Gs deceleration. Either or both of the cam block 70 and flange 130 position can be altered to adjust the size of the gap. Cam block 70, for example, can be moved forward with respect to the vehicle to reduce the size of the gap. Also as an example, flange 130 can be positioned farther away from cam block 70 when the pedal arm 30 is in an unapplied position to increase the gap size.

Figure 3:
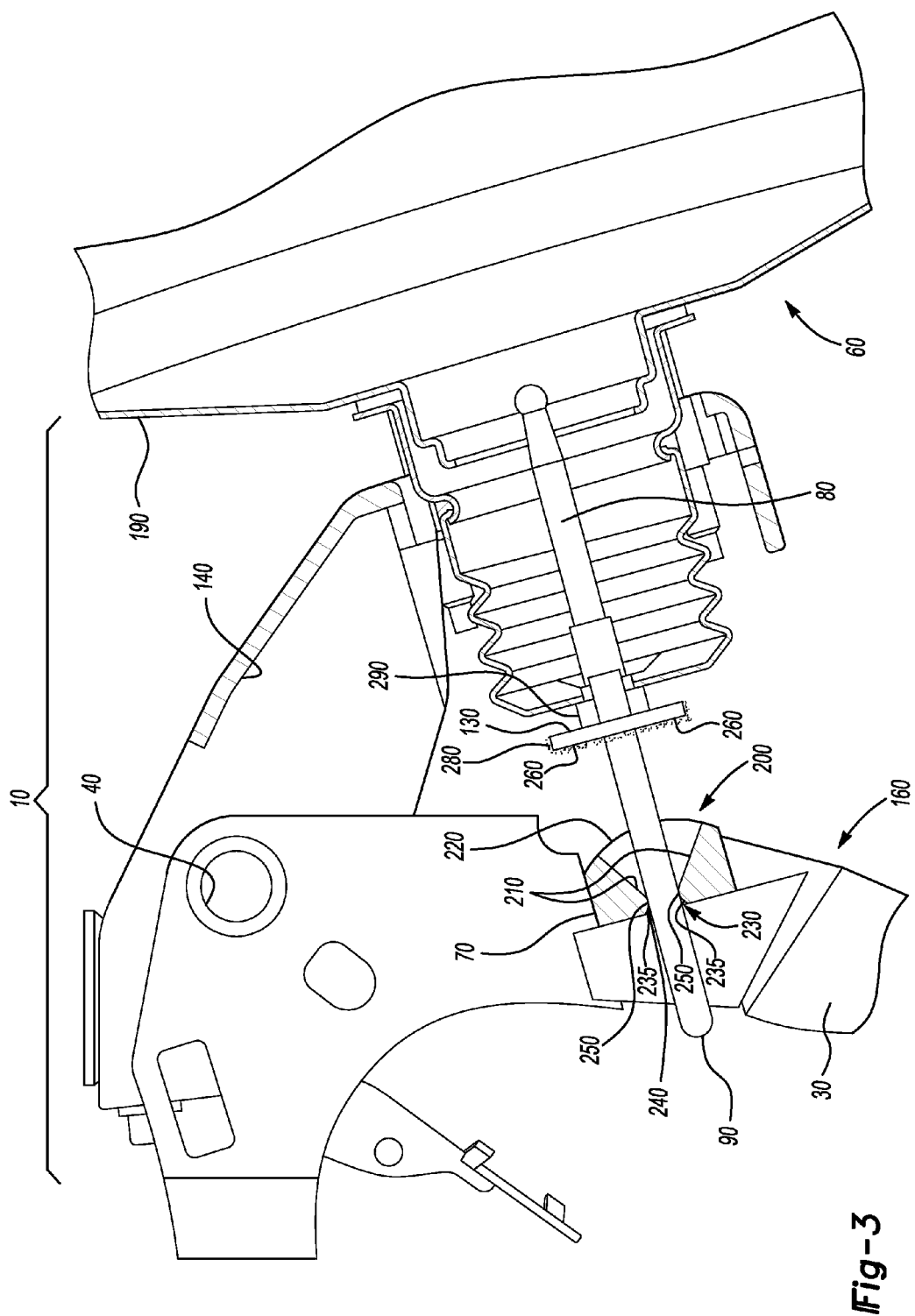
FIG. 3 is another cross-sectional view of the vehicle braking assembly of FIG. 1.

FIG. 3 is another cross-sectional view of the vehicle braking assembly of FIG. 2. The section parses through the power booster assembly 60 and illustrates how the push rod 80 is inserted through a guide 200 formed in the cam block 70. Push rod 80 can be inserted into the cam block 70 through guide 200. In this manner, guide 200 and push rod 80 are matable or compatible components. Guide 200 includes a tapered surface 210 formed in the cam block 70. A first end of the guide 200 defines an orifice 220 and the second end of the guide defines a smaller orifice 230. In this embodiment, the tapered surface 210 has a conical shape. The cone is approximately defined by a surface angled 45 degrees with respect to orifice 230. The conical surface 210 can have a wider or narrower construction. In another embodiment the conical surface 210 is defined by a surface angled between 10 and 170 degrees with respect to orifice 230.

The tapered surface 210 of the guide 200 directs the push rod 80 through orifice 240 in the pedal arm 30, as shown in FIG. 3. The cam block 70 includes two rounded corners 250 at orifice 230 that ease the push rod's ability to slide and rotate with respect to the guide 200. Each corner 250 has a rounded corner or surface with a radius of curvature. The rounded corners enable the push rod 80 to rotate against the cam block 70 and pedal arm 30. As the pedal arm 30 is rotated towards the booster assembly 60, the push rod 80 also rotates about corner 250. A relief surface 235 is provided on the opposite end of corner 250 as the tapered surface 210. Push rod 80 rotates with respect to a ball joint in the booster assembly 60 and corner 250 against relief surface 235. In the shown embodiment, rotation of the pedal arm 30 is not coextensive with the rotation of the push rod 80 as some of the rotational energy of the pedal arm is translated to the flange 130 on push rod. In other embodiments, the cam block 70 is configured to enable greater or lesser rotation of the push rod 80 with respect to the pedal arm 30.

The flange 130, as shown in FIG. 3, is an interface surface 260 fixed with respect to the push rod 80. When flange 130 is engaged with the cam block 70, the push rod 80 moves with respect to a valve block housed in the power booster assembly 60. Flange 130 is a flat, solid member. In another embodiment, flange 130 is a hollow member. Flange 130 has a significantly larger cross-sectional area than the push rod 80, with respect to a longitudinal axis of the push rod. Flange 130 has a cross-section designed not to fit into the tapered surface 210 of the cam block 70 and to apply pressure to the forward surface of the power booster 60 when the flange is sufficiently pressed. Though the flange 130 is shown as a square in FIG. 3, in other embodiment flange can have a rounded surface. With the rounded surface of the flange 130, the cam block 70 and pedal arm 30 give symmetry to the assembly 60 with respect to the push rod. With a rounded surface on the booster flange 130, the booster push rod 80 can be restricted from substantially rotating about its axis through a tapered mating surface (e.g., 210) formed in the pedal arm. The flange 130 is "keyed" to interface with pedal arm 30 in a predetermined position.

In the illustrated embodiment of FIG. 3, flange 130 is at least partially coated with an insulation material 280. The material 280 can be spray applied for example. The insulation material 280 reduces noise from the assembly 10 when the flange 130 engages the cam block 70. Exemplary insulation materials include rubber, foam or plastics. Material 280 can be applied through a plastic over-molded or rubber bumper part fitted on the flange 130. In another embodiment, the insulation material 280 is applied to a forward surface of the cam block 70.

A nut 290, as shown in FIG. 3, is formed onto the push rod 80 and positioned against the flange 130. The nut 290 can provide structural support to the flange 130. In another embodiment, the nut 290 is removed from the assembly 60.

As illustrated in FIG. 3, the push rod 80 extends completely through the pedal arm 30. In this way a clevis is not required to restrict movement of the push rod with respect to the pedal arm; the push rod 80 is sufficiently aligned with the pedal arm 30 regardless of whether the pedal arm is engaged with flange 130. In FIG. 3, the pedal arm 30 is shown in an unapplied position and is not engaged with the flange 130 of the push rod. Moreover, once the braking assembly 10 is assembled the push rod 80 remains appropriately aligned with the pedal arm 30 to ensure engagement. The length of the push rod 80 is sufficiently long so that with the booster at maximum stroke and the pedal arm 30 in rest position, the rod does not disengage the pedal arm.

Figure 4:
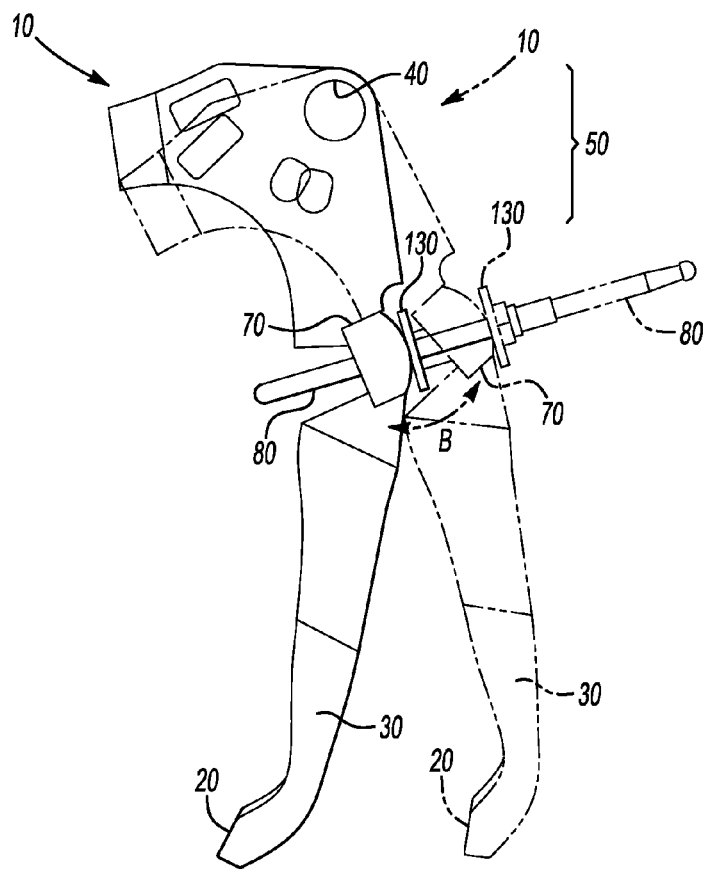
FIG. 4 is a side view of the pedal arm and power booster rod of FIG. 1, traveling from a first position to a second position.

Referring now to FIG. 4, there is shown therein a side view of a braking assembly 10 of FIG. 1. The pedal arm 30 and power booster rod 80 are shown traveling from a first position to a second position. The brake assembly 10 is shown in the first position through solid line. The first position is an applied position for the braking assembly 10. The pedal 20 is pressed from an unapplied position to an applied position. Pedal arm 30 rotates so that the cam block 70 engages the flange 130 as shown. The flange 130 is configured to engage the cam block 70 when the brake pedal 20 is applied and travels a predetermined amount, e.g., 35 millimeters. As pedal 20 is further applied, the pedal arm 30 rotates about point 40 at the top end 50 of the pedal arm 30. Pedal arm 30 is rotated into the second position, shown in phantom, a further applied position.

Flange 130 is translated forward with respect to the vehicle. Push rod 80 also moves with flange from the first position farther forward with respect to the vehicle into a second position.

Figure 5:
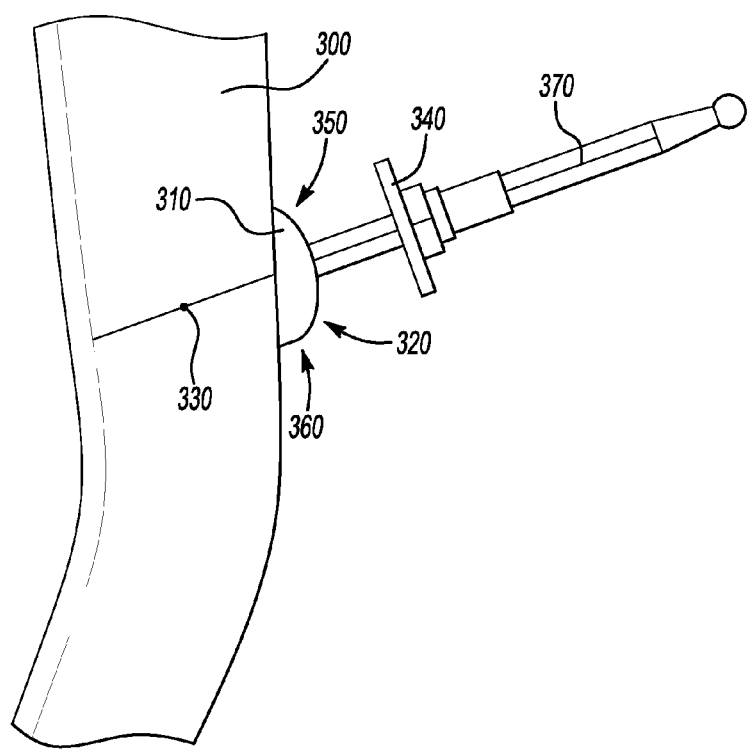
FIG. 5 is a side view of a brake pedal arm with cam block according to another exemplary embodiment of the present invention.

Referring now to FIG. 5 there is shown a side view of an exemplary brake pedal arm 300 with cam block 310 according to another embodiment of the present invention. The cam block 310 shape can be made as a curved surface, ramped surface or off-centered radius to reduce pedal travel. The cam block 310 can be positioned along different points of the booster push rod's longitudinal axis to provide different points of contact between the pedal arm 300 and power booster. In the illustrated embodiment, the pedal arm 300 incorporates cam block 310 that has a curved interface surface 320. A center point 330 for the surface 320 is moved rearward with respect to the vehicle to alter the engagement dynamics between the cam block 310 and a flange 340. The center point 330 of the surface 320 is moved with respect to the pedal arm 300. Thus the profile of the cam block 310 defines surface 320 having a variable radius of curvature with respect to the pedal arm 300. At an upper end 350 of the cam block 310 the radius of curvature with respect to the pedal arm is smaller than the radius of curvature at a bottom end 360 of the cam block. As the surface 320 engages the flange 340 a push rod 370 moves into a power booster. The provided cam block 310 and surface 320 with variable radius of curvature yields brake pedal travel reduction while achieving the same booster travel as, for example, the embodiment discussed with respect to FIGS. 1-4.

Figure 6:
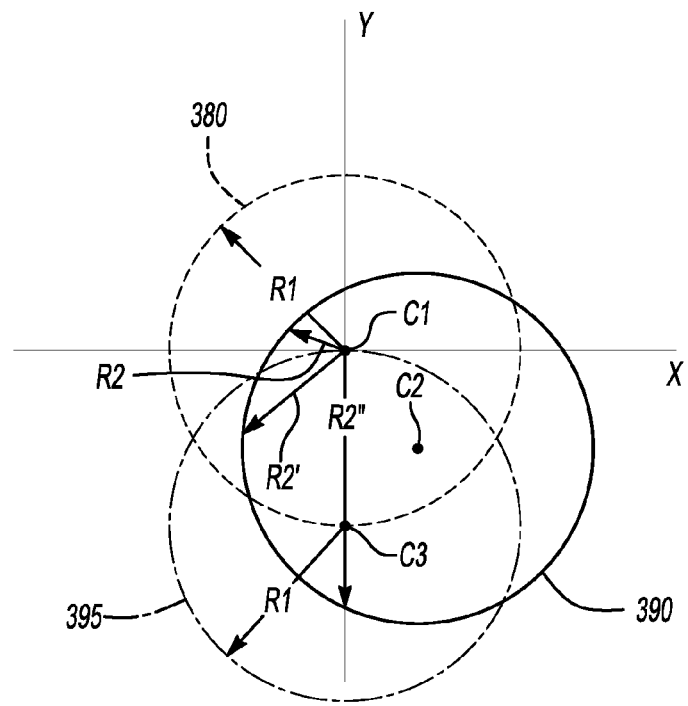
FIG. 6 is a schematic diagram of the side profile of two cam blocks with respect to a pedal arm.

With reference to FIG. 6, there is shown therein a schematic diagram of side profiles of two cam blocks with respect to a pedal arm. The Y-axis represents a vertical edge of a pedal arm. The X-axis represents a longitudinal axis of a vehicle. Three circular members 380, 390 and 395 are shown positioned with respect to the Y-axis. Each member 380, 390, 395 represents the front profile of a cam block. Cam block 380 has a center point $C_1$. Cam block 380 has a uniform radius of curvature. The second member 390 represents the profile of a cam block with center point $C_2$ moved downward with respect to the pedal arm and rearward with respect to the vehicle. The resulting arc on the cam block 390 is a curved surface that has a variable radius of curvature with respect to the y-axis or pedal arm, e.g., $R_2$, $R_2'$ and $R_2''$ as shown. Radius $R_2$ is smaller than $R_2'$ and $R_2''$ while $R_1$ is uniform with respect to the y-axis and pedal arm. The third member 395 represents the profile of a cam block with center point $C_3$ only moved downward with respect to the y-axis or pedal arm. The third member 395 has a uniform radius of curvature equal to the radius of member 380 ($R_1$). In this way, the space or gap between cam block surfaces and a pedal arm is consistent between the profile designs of cam blocks 380 and 395, yet the gap is greater for the position of cam block 390. Movement of the center point of the cam block surface provides different levels of pedal-ratio variability.

Figure 7:
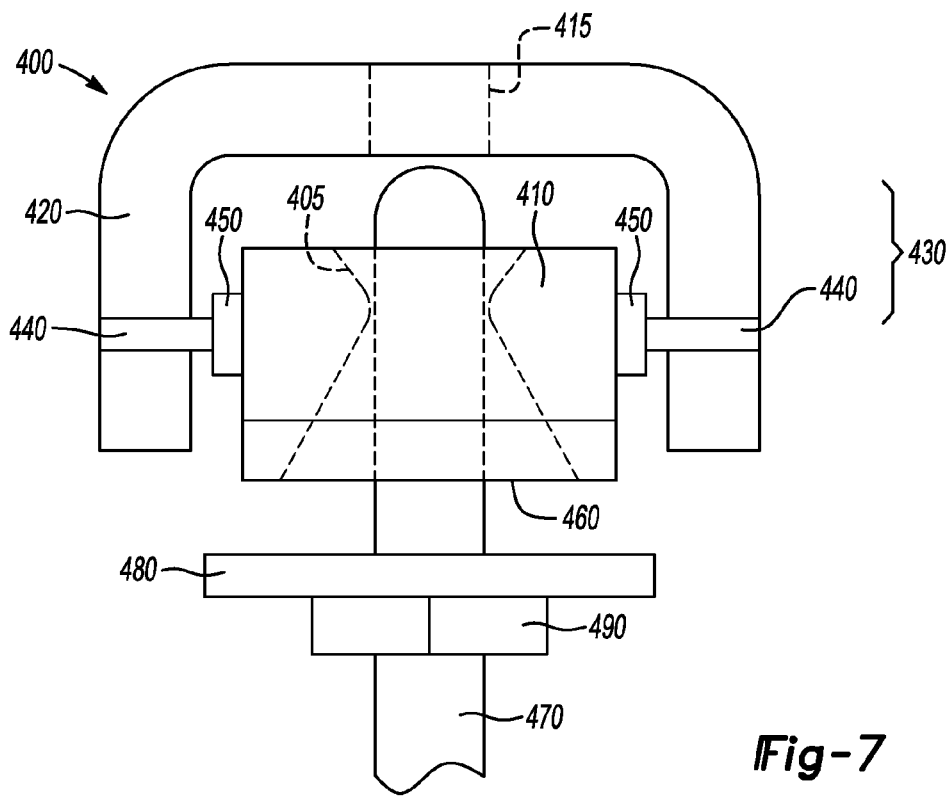
FIG. 7 is a top view of a vehicle braking assembly according to another exemplary embodiment of the present invention.

Referring now to FIG. 7 there is shown therein is a top cross-sectional view of a vehicle braking assembly 400 according to another exemplary embodiment of the present invention. The braking assembly includes a cam block 410 that is configured to move with respect to a pedal arm 420. In this manner, the braking assembly 400 includes a gap management assembly 430. Cam block 410 is configured to rotate with respect to the pedal arm 420. The assembly 400 includes two pins 440 shown inserted through the pedal arm 420. The cam block 410 includes two bushings 450 on each side. Pins 440 are inserted in bushings 450. Pin 440 is coupled to the cam block 410 and pedal arm 420. Cam block 410 has an orifice 460 configured so that a push rod can extend therethrough. Cam block 410 has formed therein a tapered surface 405 to guide push rod 470. In the shown embodiment, cam block 410 has a flat surface; in another embodiment, the cam block has a curved surface which interfaces an interface surface 480 or flange fixedly attached to the push rod. Where push rod 470 extends through cam block 410 an orifice 415 is formed in pedal arm 420 to enable push rod to selectively extend therethrough. A nut 490 is attached to the rod 470 to provide support to the surface 480. The block 410 may be rotated, as shown in FIG. 7, depending on the angle that the booster rod 470 takes during pedal travel. This design leads to a reduction in brake travel while achieving the same booster travel. This concept can also be used to increase pedal travel with the same booster rod travel if required for pedal feel.

Figure 8:
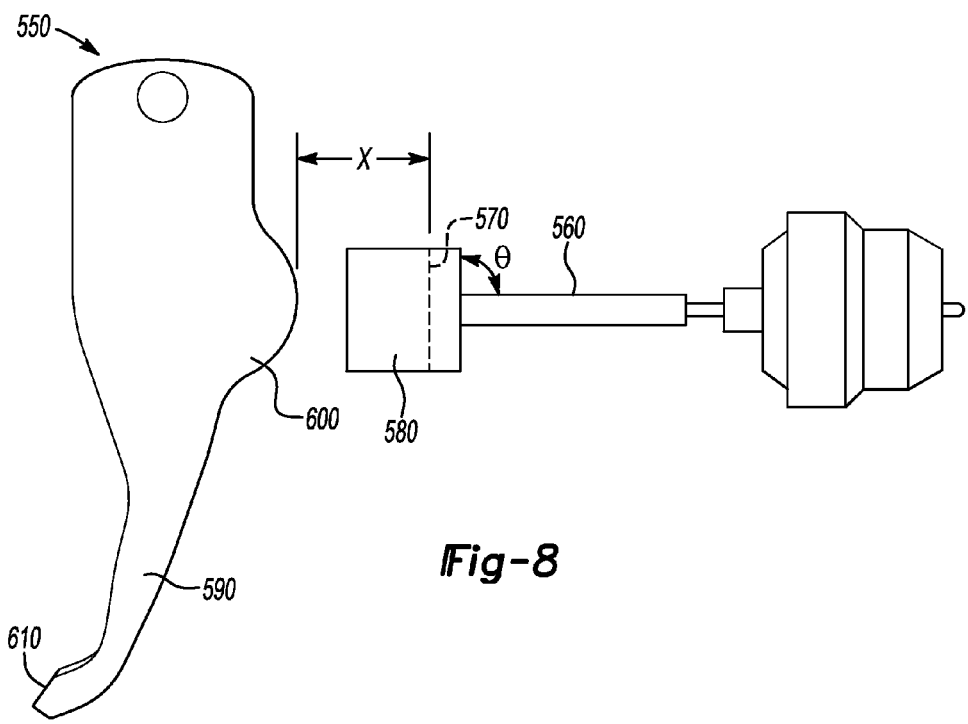
FIG. 8 is a side view of a vehicle braking assembly according to another exemplary embodiment of the present invention.

FIG. 8 is a side view of a vehicle braking assembly 550 according to another exemplary embodiment of the present invention. In this embodiment, a booster rod 560 is non-rotatable and is restricted from moving angularly. The push rod 560 includes an interface surface 570 angularly positioned with respect to the push rod 560. In the shown embodiment, the interface surface 570 is positioned at an angle, $\Theta$, which is 90 degrees with respect to the push rod 560. Interface surface 570 includes two guide flanges 580 that extend along the longitudinal axis of the push rod 560. Guide flanges 580 are positioned with respect to the interface surface 570. Guide flanges 580 steer or direct pedal arm 590 into engagement with the interface surface 570 in instances where the pedal arm may be misaligned with the interface surface. A cam surface 600 is formed onto the pedal arm 590. Thus, design and assembly tolerances for the pedal arm 590 and push rod 560 are increased. This embodiment increases the ease of assembly and decreases the required packaging space for the pedal assembly and booster. The simpler design also reduces part costs. The push rod 560 does not need to extend through the pedal arm 590.

A pedal 610 is attached to a pedal arm 590. Pedal arm 590 includes the cam surface 600 integrally formed therein. In this manner cam surface 600 is coupled to the pedal arm 590. Cam surface 600 translates the rotational energy of the pedal arm 590 to the linear movement of the push rod 560.

There is a spatial distance or gap, "X", between the cam surface 600 and the interface surface 570 as shown in FIG. 8. The pedal arm 590 rotates partially through its arc of rotation without engaging the interface surface 570. This gap, "X", delays the response from the power boosters and the hydraulic braking system when the pedal is applied. The gap distance can change to adjust to vehicle specifications or user demands. The gap can be larger or smaller than the gap illustrated in FIG. 8. An exemplary gap is 6 mm. Either or both of the cam block surface and interface surface 570 can be altered to adjust the size of the gap.

Figure 9:
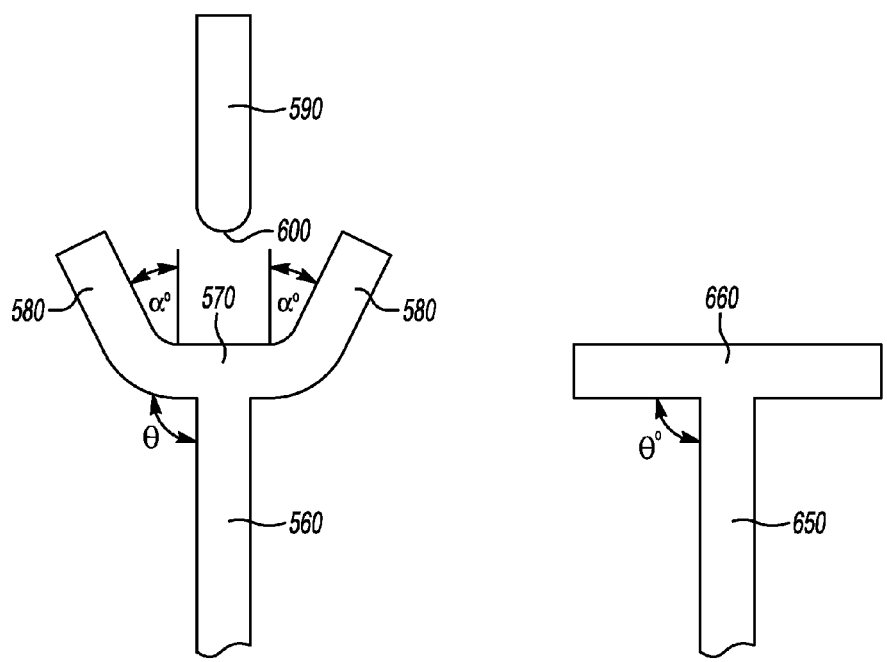
FIG. 9 is a top view of the power booster rod shown in FIG. 8.

FIG. 9 is a top cross-sectional view of the push rod 560 shown in FIG. 8. As shown, the push rod 560 includes an interface surface 570 angularly positioned with respect to the push rod. In the shown embodiment, the interface surface 570 is positioned at a 90 degree angle with respect to the push rod 560. Interface surface 570 includes two guide flanges 580 that extend along the longitudinal axis of the push rod 560. Two guide flanges are angularly positioned with respect to the interface surface 570 as shown in FIG. 9. In the shown embodiment, the guide flanges 580 are positioned at an angle, $\alpha$, which is 20 degrees with respect to the longitudinal axis of push rod 560. Guide flanges 580 steer or direct pedal arm 590 into engagement with the interface surface 570 in instances where the pedal arm may be misaligned with the interface surface. Thus, design and assembly tolerances for the pedal arm 590 and push rod 560 are increased. This embodiment increases the ease of assembly and decreases the required packaging space for the pedal assembly and booster. The simpler design also reduces part costs.

Figure 10:
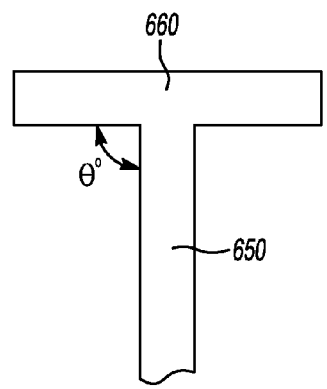
FIG. 10 is a top view of a power booster rod according to another exemplary embodiment of the present invention.

In an alternative embodiment, a push rod 650 is provided that has a flat interface surface 660. As shown in FIG. 10, the push rod 650 includes an interface surface 660 that is flat and fixed with respect to push rod 650. Surface 660 is angularly positioned with respect to the push rod. In the shown embodiment, the interface surface 660 is positioned at an angle, Θ, which is a 90 degree angle with respect to the push rod 650. The push rod 650 does not require guide flanges as the surface 660 is sufficiently wide so as to accommodate pedal shifting (i.e., side-to-side) with respect to the push rod 650.

Figure 11:
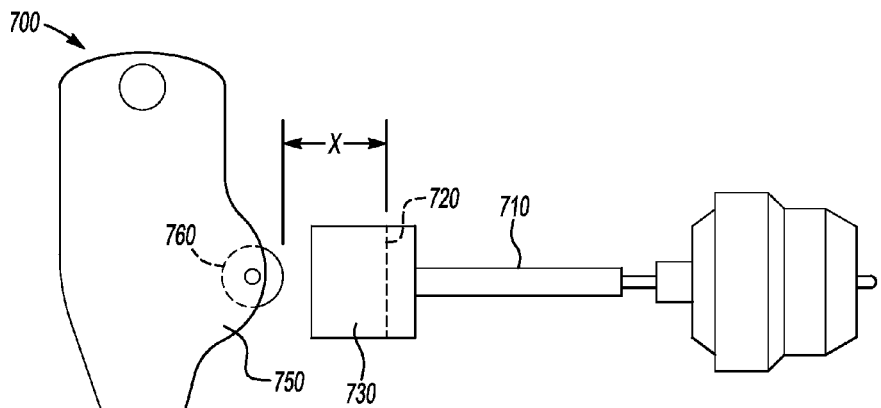
FIG. 11 is a side view of a vehicle braking assembly according to another exemplary embodiment of the present invention.

Referring now to FIG. 11, there is a side view of a vehicle braking assembly 700 according to another exemplary embodiment of the present invention. In this embodiment, the booster rod 710 is non-rotatable and is restricted from moving angularly. The push rod 710 includes an interface surface 720 angularly positioned with respect to the push rod. In the shown embodiment, the interface surface 720 is positioned at an angle, Θ, which is 90 degrees with respect to the push rod 710. Interface surface 720 includes two guide flanges 730 that extend along the longitudinal axis of the push rod 710. This embodiment increases the ease of assembly and decreases the required packaging space for the pedal assembly and booster. The simpler design also reduces part costs.

Guide flanges 730 are positioned with respect to the interface surface 720. Guide flanges 730 steer or direct pedal arm 740 into engagement with the interface surface 720 in instances where the pedal arm may be misaligned with the interface surface. A cam surface 750 is formed onto the pedal arm 740.

A roller 760 is also coupled to the pedal arm 740 and configured to engage with the interface surface 720, as shown in FIG. 11. The roller 760 translates the rotational energy of the pedal arm 740 to the linear movement of the push rod 710. A pedal 770 is attached to a pedal arm 740.

There is a spatial distance or gap, "X", between the roller 760 and the interface surface 720 as shown in FIG. 11. The pedal arm 740 rotates partially through its arc of rotation without engaging the interface surface 720. This gap, "X", delays the response from the power boosters and the hydraulic braking system when the pedal is applied. The gap distance can change to adjust to vehicle specifications or user demands. The gap can be larger or smaller than the gap illustrated in FIG. 11. An exemplary gap is 9-12 millimeters. Either or both of the roller 760 and interface surface 720 can be altered to adjust the size of the gap.

Figure 12:
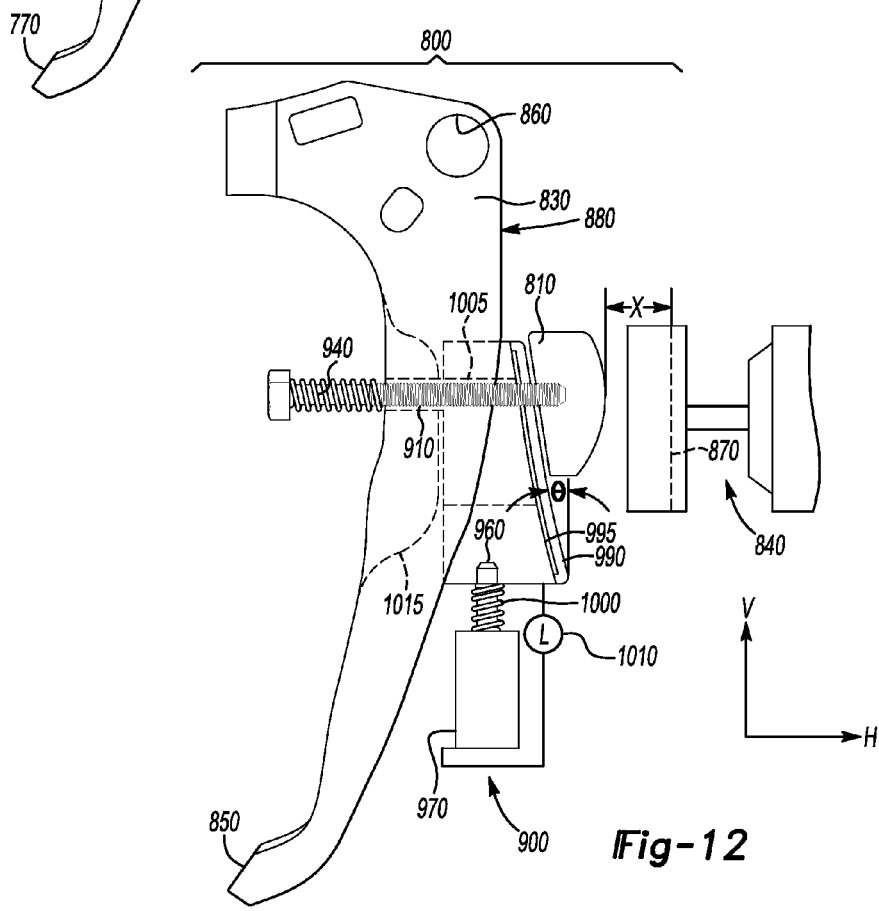
FIG. 12 a side view of a vehicle braking assembly with movable cam block according to another exemplary embodiment of the present invention.

FIG. 12 a side view of a vehicle braking assembly 800 with movable cam block 810 according to another exemplary embodiment of the present invention. This embodiment includes a gap management system 820 or assembly that manages or controls the gap, "X", or spatial distance between a pedal arm 830 and power booster 840. When disengaged the cam block 810 and power booster 840 define a distance therebetween, shown as "X" in FIG. 12. The gap management system 820 is configured to alter the distance between the pedal arm 830 and power booster 840 under predetermined conditions. For example, in one embodiment when the assembly 800 is no longer able to operate in the by-wire mode, the gap management system 820 moves the cam block 810 to a position that is closer to the power booster 840. Since in this embodiment the vehicle is not utilizing regenerative braking resources in this mode it can be undesirable to have a significant spatial distance between the pedal arm 830 and the power booster 840.

In the illustrated embodiment of FIG. 12, the braking assembly 800 includes a brake pedal 850 that is coupled to the pedal arm 830. Pedal arm 830 is configured to rotate with respect to a vehicle structure, pivoting about point 860. Pedal arm 830 engages the power booster 840. The power booster 840 includes an interface surface 870 configured to engage a portion of the pedal arm 830. The pedal arm 830 includes a cam block 810 attached through a spring-loaded fastener (screw or guide pin 910) onto the pedal arm; cam block 810 sits on the angled surface of a wedge 995. In the illustrated embodiment, the wedge 995 is on a forward surface 880 of the pedal arm 830, approximately one third down the vertical axis of the pedal arm. The spatial distance, labeled as "X" between the cam block 810 and surface 870 of the power booster 840 can be changed by changing the position of the cam block 810 with respect to the pedal arm 830. The block 810 is configured to move with respect to the pedal arm 830 and in this way can change the distance between the pedal arm and power booster 840, i.e., managing the gap therebetween.

The cam block 810, as shown in FIG. 12, is movable with respect to the pedal arm 830 in a horizontal direction, "H." In this embodiment, drive assembly 900 has at least one spring that is configured to propel the wedge 995 upwards thereby sliding the cam block 810 towards engagement with the power booster 840.

Drive assembly 900 is shown in the embodiment of FIG. 12. Drive assembly 900 includes a spring-loaded solenoid 960. Drive assembly 900 is configured to move the wedge 995 in a vertical direction with respect to the pedal arm 830. Wedge 995 includes a guide 990 on a front surface which is angularly position with respect to a vertical axis "V". In the shown embodiment, Θ is approximately equal to 15 degrees. Guide member 990 directs cam block 810 frontward with respect to the vehicle when the drive assembly 900 applies an upward extending force against the cam block 810 due to the spring 940. Guide member 990 directs cam block 810 rearward when the drive assembly 900 applies a downward extending force against the cam block. Though the guide member 990 is shown coupled to the wedge 995, guide member can be detached from wedge or formed therein. Cam block 810 is attachable to guide 990 and configured to slide with respect to the guide when the wedge 995 is moved vertically. Wedge includes a slot 1005 formed therein. The slot 1005 enables the wedge to move with respect to a screw 910 to which the cam block 810 is attached. A reaction surface 1015 is formed in the pedal arm 830 which reduces the friction against the wedge 995 as it slides with respect to the pedal arm.

Drive assembly 900 includes an actuator 970 configured to actuate the solenoid 960. A spring 1000 is also included in the drive assembly 900 of FIG. 12. Spring 1000 is journaled onto the solenoid 960. Spring 1000 is configured to bias the wedge 995 towards an upward position with respect to the pedal arm 830. Cam block 810 is biased against engagement with the power booster 840 by the spring 940. A latching mechanism 1010 is included in the assembly 900 and configured to selectively secure the spring 1000 in a predetermined position with respect to the pedal arm 830. Latching mechanism 1010 is releasable from the spring 1000 to enable spring to apply a force against the wedge 995. Latching mechanism 1010 is linked to the actuator 970 which controls the release of the latching mechanism as well as the solenoid 960. When the braking assembly loses power spring 1000 can still move wedge 995 upward and the cam block 810 closer to the power booster 840 through the release of latching mechanism 1010. If Θ is kept at a predetermined amount, e.g. less than 10 degrees depending on material combinations, the latching mechanism 1010 can be inactive and the wedge 995 can act as a self-locking mechanism, not sliding due to frictional forces.

The gap management system 820 is configured to release the cam block 810 into a position that is closer to the power booster 840 under predetermined conditions. The gap management system 820 of FIG. 12 is configured to decrease the spatial distance, "X", between the pedal arm 830 and booster 840 when the assembly 800 can no longer operate in the by-wire mode. The drive assembly 900 will release the cam block 810 and the spring 1000 will push the cam block 810 toward engagement with interface surface 870. This will minimize the gap between the pedal arm 830 and the booster 840 which will reduce the amount of extra travel required to activate the booster.

Figure 13:
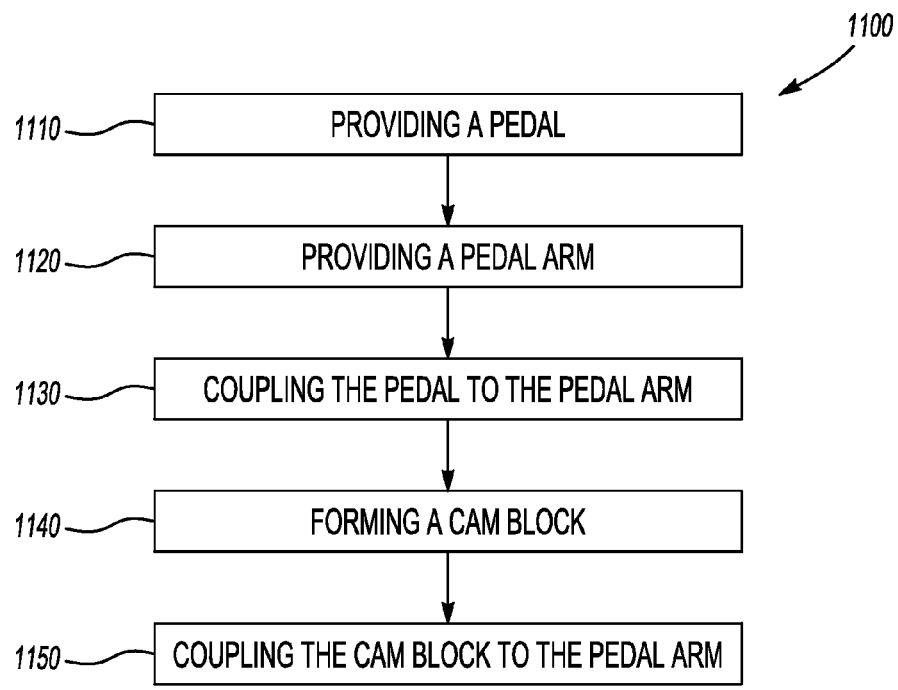
FIG. 13 is a flowchart illustrating a method of manufacturing a vehicle braking assembly according to an exemplary embodiment of the present invention.

Also included with the present teachings are various methods 1100, 1200 of manufacturing vehicle braking assemblies. Referring now to FIG. 13 there is a flowchart illustrating a method of manufacturing a vehicle braking assembly 1100 according to an exemplary embodiment of the present invention. The method 1100 includes the steps of: providing a pedal 1110; providing a pedal arm configured to pivot with respect to the vehicle 1120; coupling the pedal to the pedal arm 1130; forming a cam block configured to engage a power booster 1140; and coupling the cam block to the pedal arm 1150. Exemplary braking assemblies are shown with respect to FIGS. 1-12. Coupling the pedal to the pedal arm can be performed using known attachment techniques such as casting, welding, using fasteners or other techniques. Cam block can be similarly coupled to the pedal arm or can be integrally formed with the pedal arm as well, as shown for example with respect to FIGS. 8 and 11. Cam block can also be coupled to the pedal arm in a manner to move with respect to the pedal arm, as shown for example in FIGS. 7 and 12. In another embodiment, the method includes forming a guide in the cam block. The guide is configured to mate with a power booster push rod.

Figure 14:
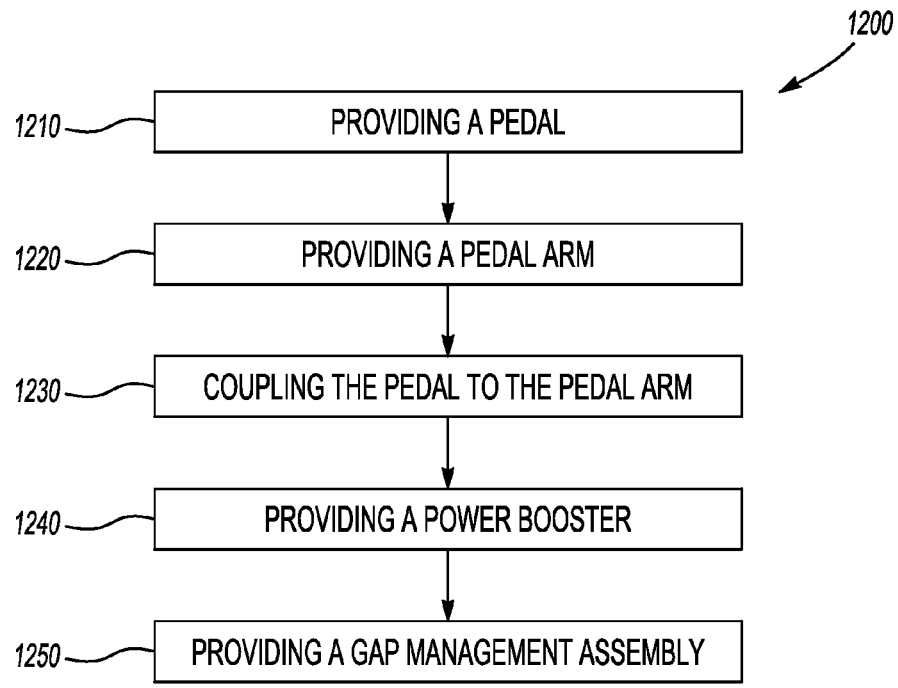
FIG. 14 is a flowchart illustrating a method of manufacturing a vehicle braking assembly according to an exemplary embodiment of the present invention.

FIG. 14 is a flowchart illustrating a method of manufacturing a vehicle braking assembly 1200 according to an exemplary embodiment of the present invention. The method 1200 includes the steps of: providing a pedal 1210; providing a pedal arm configured to pivot with respect to the vehicle 1220; coupling the pedal to the pedal arm 1230; providing a power booster configured to engage the pedal arm 1240; and providing a gap management device configured to control the spatial distance between the pedal arm and power booster when not engaged 1250. Exemplary gap management devices are illustrated, in FIGS. 7 and 12. Gap management devices are configured to control the spatial distance between the pedal arm and power booster. In one embodiment, the method includes forming a block in the pedal arm; and configuring the block to move with respect to the pedal arm. The block can be a cam block as shown in FIG. 12 for example.

The method can also include: providing a drive assembly configured to move the block with respect to the pedal arm under predetermined conditions. Drive assembly can include a spring-loaded solenoid as shown, for example, with respect to FIG. 12. Drive assembly can also include other devices such as levers or propellants. In one embodiment, the method also includes coupling a guide member, configured to direct the block, to the pedal arm. Guide member can be, for example, formed in the pedal arm or attached thereto as shown in FIG. 12.

The disclosed braking assemblies can be composed of, for example, a metal or hard plastic, for example. The illustrated cam blocks are composed of a hard plastic and can be attached to pedal arm using a fastener such as clips, bolts or rivets. In another embodiment, a cam block is molded with the pedal arm. Exemplary material selections for the components of the assemblies include aluminum alloys, steel, and titanium alloys. The disclosed braking assemblies relate to by-wire braking assemblies. The braking assemblies and features are, however, compatible with conventional brake assemblies and not limited to by-wire braking assemblies. While the shown embodiments include a spatial distance between the power booster and the pedal arm, other embodiments of the teachings herein do not include a distance therebetween but are still within the scope of the present invention.

It will be apparent to those skilled in the art that various modifications and variations can be made to the methodologies of the present disclosure without departing from the scope of its teachings. Other embodiments of the invention will be apparent to those skilled in the art from consideration of the specification and practice of the teachings disclosed herein. It is intended that the specification and examples be considered as exemplary only.

While the best modes for carrying out the invention have been described in detail, those familiar with the art to which this invention relates will recognize various alternative designs and embodiments for practicing the invention within the scope of the appended claims.

We claim:

1. A vehicle brake pedal assembly comprising:
   a pedal arm having a pivot end, a free end, and a cam surface integrally formed therebetween;
   a power brake booster having a push rod including an interface surface that is spaced from the cam surface by a gap in an unapplied position and contacts the cam surface in an applied position; and
   first and second guide flanges, each extending from opposing ends of the interface surface.

2. The assembly of claim 1, wherein movement of the pedal arm through the gap prior to reaching the applied position enables a by-wire braking system in which regenerative braking occurs, and wherein movement of the pedal arm past the gap and to the applied position enables the power brake booster to activate friction brakes.

3. The assembly of claim 1 wherein the first guide flange and the second guide flange extend from opposite sides of the interface surface at an angle (a) to direct the pedal arm into engagement with the interface surface.

4. The assembly of claim 3 wherein the angle (a) is 20 degrees with respect to a longitudinal axis of the push rod.

5. The assembly of claim 1 wherein movement of the pedal arm through the gap prior to reaching the applied position delays actuation of hydraulic brakes via the power brake booster when the pedal arm is moved through the gap.

6. The assembly of claim 1 wherein the gap has a distance (X) that may be adjusted to change the time required for the cam surface of the pedal arm to contact the interface surface.

* * * * *